United States Patent [19]

Sameshima et al.

[11] Patent Number: 5,061,861
[45] Date of Patent: Oct. 29, 1991

[54] MOS INTEGRATED CIRCUIT FOR DRIVING LIGHT-EMITTING DIODES

[75] Inventors: Kazuhiro Sameshima; Masaru Ohnishi, both of Kamakura, Japan

[73] Assignee: Mitsubishi Denki Kabushiki Kaisha, Tokyo, Japan

[21] Appl. No.: 347,492

[22] Filed: May 4, 1989

[30] Foreign Application Priority Data

May 20, 1988 [JP] Japan .................. 63-124401
Feb. 17, 1989 [JP] Japan .................. 1-38661

[51] Int. Cl.$^5$ ............... H03K 3/01; H03K 17/56; H03K 3/42
[52] U.S. Cl. .................. 307/270; 307/241; 307/244; 307/311
[58] Field of Search ........... 307/311, 270, 571, 573, 307/577, 583, 584, 254, 241, 248, 244

[56] References Cited

U.S. PATENT DOCUMENTS

| | | | |
|---|---|---|---|
| 3,370,182 | 2/1968 | Blank | 307/244 |
| 3,569,741 | 3/1971 | Bolick, Jr. | 307/244 |
| 4,206,368 | 6/1980 | Lenderking | 307/244 |
| 4,718,063 | 1/1988 | Reedy et al. | 307/243 |

FOREIGN PATENT DOCUMENTS

| | | |
|---|---|---|
| 55733 | 10/1985 | Japan . |
| 132951 | 3/1988 | Japan . |
| 216331 | 3/1988 | Japan . |
| 290075 | 6/1988 | Japan . |

OTHER PUBLICATIONS

Herzog, "An Electronic Selector Switch Employing Transistors", RCA Technical Notes Published by The Radio Corporation of America RCA Laboratories, Princeton, N.J., Apr. 1958, pp. 1-3.

Primary Examiner—Stanley D. Miller
Assistant Examiner—Trong Phan
Attorney, Agent, or Firm—Morrison Law Firm

[57] ABSTRACT

An MOS integrated circuit for driving light-emitting diodes (LED's) comprises first constant current circuits, each of which is for one of the LED's and includes a first drive circuit for maintaining the drive current for the associated LED at a predetermined value established by a first reference voltage. The integrated circuit further includes a second constant current circuit which is connected to all of the first constant current circuits to form a mirror circuit with each of said first constant current circuits. A current detecting element detects a predetermined magnitude of current flowing therethrough and develops a current-representative detection voltage. A second drive circuit within the second constant current circuit responds to the detection voltage and a second reference voltage by maintaining said first reference voltage at a predetermined value so that the LED drive current is determined by the said detection voltage and second reference voltage.

8 Claims, 3 Drawing Sheets

MOS INTEGRATED CIRCUIT FOR DRIVING LIGHT-EMITTING DIODES

This invention relates to an MOS integrated circuit for driving light-emitting diodes (LED's), included, for example, in an LED array in a head which is used as a light source in an electrophotographic printer.

BACKGROUND OF THE INVENTION

Usually an LED array head includes several thousand LED's and in order to drive these LED's several tens to several thousand integrated circuits each having 32 to 64 driver circuits must be used.

Conventionally, as LED driving integrated circuits, MOS integrated circuits shown, for example, in the official gazette of Unexamined Japanese Patent Publication No. SHO 60-198872 have been used.

FIG. 1 shows an LED driving MOS integrated circuit disclosed in the above-stated Unexamined Japanese Patent Publication No. SHO 60-198872.

Referring to FIG. 1, an LED driving circuit 1 controls power supplied to LED's 3a–3c from a DC power supply 2 so that the brightness of the LED's is maintained at a predetermined value. The LED driving circuit 1 is fabricated as an MOS integrated circuit on a single substrate.

The LED driving MOS integrated circuit 1 comprises MOS transistors 4 connected in series with the respective LED's 3a–3c The MOS transistors 4 serve as current limiting elements for limiting the values of currents flowing through the respective LED's 3a–3c. The MOS transistors 4 are connected to the positive terminal of the DC supply 2 through associated resistors 5 A desired LED driving current limited by the MOS transistors 4 flows through the associated resistors 5, and a voltage $V_1$ at a level determined by the magnitude of current flowing through the respective ones of the LED's 3l–3c is developed across the resistor 5. The voltage $V_1$ is applied to a $\propto$ input terminal of an associated voltage comparator 6.

A depletion-type MOS transistor 7 having its gate electrode connected directly to its own source electrode is used to derive a reference voltage $V_r$ which is at a constant level regardless of the level of the terminal voltage $V_O$ of the power supply 2 and is applied to $-$input terminals of the respective voltage comparators 6 The drain electrode of the transistor 7 is connected to the $-$input terminals of the respective voltage comparators 6 and also connected through a resistor 8 to the positive terminal of the power supply 2. The source electrode of the transistor 7 is grounded together with its gate electrode The drain current $I_D$ of the transistor 7 flowing through the resistor 8 causes the voltage $V_r$ to be developed across the resistor 8, and this voltage is applied as a reference voltage to the $-$input terminals of the voltage comparators 6.

Thus each of the voltage comparators 6 develops an output voltage $V_G$ in accordance with the difference between the voltage $V_1$ and the reference voltage $V_r$. This output voltage $V_G$ controls the conduction of the associated transistor 4. When $V_I < V_r$, the output voltage $V_G$ of each voltage comparator 6 increases in the positive direction to increase the drain current of the transistor 4 which in turn causes the voltage drop across the associated resistor 5 to increase. When $V_I > V_r$, the output voltage $V_G$ of each voltage comparator 6 increases in the negative direction so that the drain current of the transistor 4 decreases, which in turn causes a decrease in the voltage drop across the resistor 5. Thus, the voltage $V_1$ decreases. In this way, the conductions of the transistors 4 are controlled so as to produce the $V_I = V_r$ condition, and, accordingly, current in accordance with the level of the reference voltage $V_r$ flows through the respective transistors 4 into the LED's 3a–3c. Thus, the LED's 3a–3c are driven with constant current.

Switching transistors 9 are connected between the gates of the respective MOS transistors 4 and ground, respectively, for selectively driving the LED's 3a, 3b and 3c. The switching transistors 9 are turned on or off in response to a selection signal applied thereto from a control circuit 10, so that the desired LED's are selectively energized to emit light.

In the above-stated conventional type of LED driving integrated circuits, the resistors 5 and 8 are usually formed simultaneously as diffused resistors or polysilicon resistors, and, therefore, there is little variation in resistance value of he resistors in a particular one of the integrated circuits. However, depending on manufacturing conditions, variation of more than ÷35% could be caused in resistance value among different integrated circuits. Accordingly, variations more than ±35% in output current from such integrated circuits will be caused. That is, the output current of one integrated circuit could be two or more times that of other integrated circuits.

The quality of pictures produced by a printer depends on the uniformity of the light output of its LED heads. Therefore it is necessary to make the light output of the LED head as uniform as possible so that variations in light output may be, for example, within a range of less than ±20%. Although not discussed herein, there are other major causes for variations of the light outputs and variations of integrated circuits, namely, variations of LED array chips and focusing lenses. Therefore, in order to provide uniform light outputs at least variations of driving power supplies of the integrated circuits must be reduced to, for example, less than ±5%. In order to realize it, it is necessary to measure the output currents of respective integrated circuits and select those integrated circuits which have like values of the output currents. However, such a classification procedure is one of the largest causes of increase of the manufacturing costs.

The light output of an LED is temperature-dependent, and as temperature increases. The light output of an LED decreases. Accordingly, it is necessary that current to drive the LED be controlled in response to temperature. In the above-described conventional MOS integrated circuit 1 for driving LED's, the depletion-type MOS transistor 7 is used to develop the reference voltage $V_r$ for temperature-controlling the drive current. However, the value of $V_r$ varies from circuit to circuit due to varying manufacturing conditions which cannot be made constant, so the yield of usable integrated circuits is low, which raises the cost of the integrated circuits.

The present invention is to eliminate the above-stated disadvantages of conventional integrated circuits. According to the present invention, variations in values of output currents of integrated circuits can be minimized, so that no procedure for classifying manufactured integrated circuits is needed and the yield of usable integrated circuits is increased. Thus, the manufacturing costs of LED array heads and, hence, ultimate products Can be reduced.

SUMMARY OF THE INVENTION

According to a first embodiment of the present invention, an LED driving MOS integrated circuit includes a plurality of first constant current circuits, each for driving a respective one of a plurality of LED's. Each of the first constant current circuits comprises a current control element connected in series with an associated LED, a current detecting element connected in series with that LED for sensing current flowing into the LED and providing a detection voltage representing the sensed current, and a drive circuit which is responsive to a reference voltage and the detection voltage from the current detecting element to drive the current control element so as to maintain the drive current flowing into the LED at a predetermined value. The MOS integrated circuit according to the first embodiment of the present invention further includes a second constant current circuit common to all the LED's to be driven. The second constant current circuit is connected to the reference voltage input of the first constant current circuit and comprises, similar to the first constant current circuit, a current detecting element, a current control element and a driver circuit. The second constant circuit forms a mirror circuit With each of the first constant circuits.

According to a second embodiment of the present invention an LED driving MOS integrated circuit employs, in the second constant current circuit, a current detecting element which comprises a basic detecting component and a plurality of adjustment detecting components. A selection circuit enables desired ones of the adjustment detecting components to adjust the value of the current detecting element, as occasion demands.

Now, the LED driving MOS integrated circuit according to the present invention is described in detail with reference to the accompanying drawings.

Figure 2:
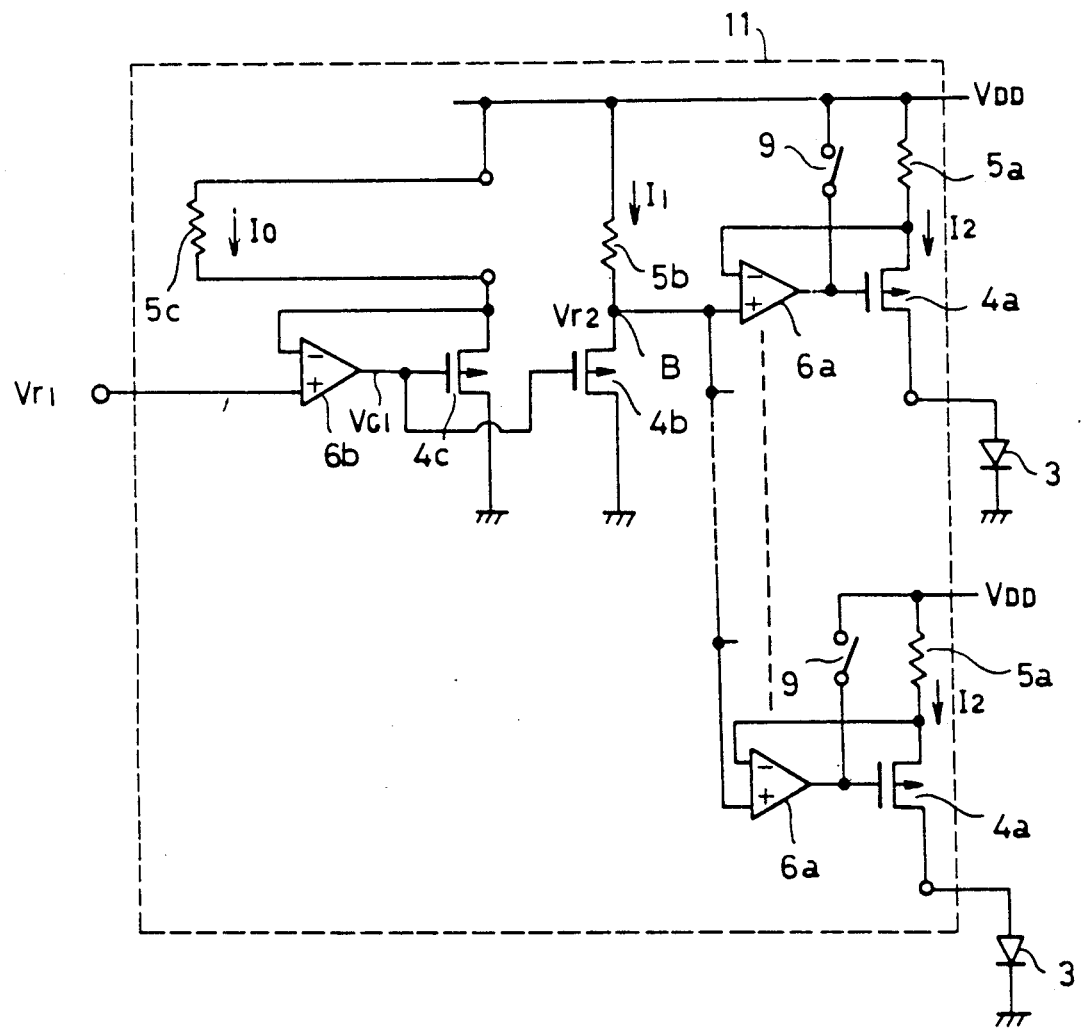
FIG. 2 is a circuit diagram of an LED driving MOS integrated circuit according to a first embodiment of the present invention.

FIG. 2 shows a basic circuit configuration of the LED driving MOS integrated circuit 11 of the present invention which includes a plurality of current control elements 4a for respective ones of LED's 3 to be driven, and current control elements 4b and 4c. The current control elements 4a, 4b and 4c are MOS transistors of like characteristics. The integrated circuit 11 includes also a plurality of circuits 6a for driving respective ones of the current control elements 4a and a circuit 6b for driving the current control elements 4b and 4c. These circuits comprise voltage comparators of like configurations. There are also provided a plurality of current detecting elements 5a for the respective LED's 3 which are resistors in the form of diffused resistors or polysilicon resistors and have the same resistance value of $R_{IN}$. The integrated circuit further includes a load resistor 5b (having a resistance value of $R_{IN}$) like the resistors 5a, which acts as a voltage drop element for producing a first reference voltage and a resistor 5c which has a resistance value $R_E$ that is substantially equal to the resistance of the current detecting element resistors 5a. As will be stated later, the resistance of the resistor 5c is particularly precisely adjusted by means of trimming or like processing.

Figure 1:
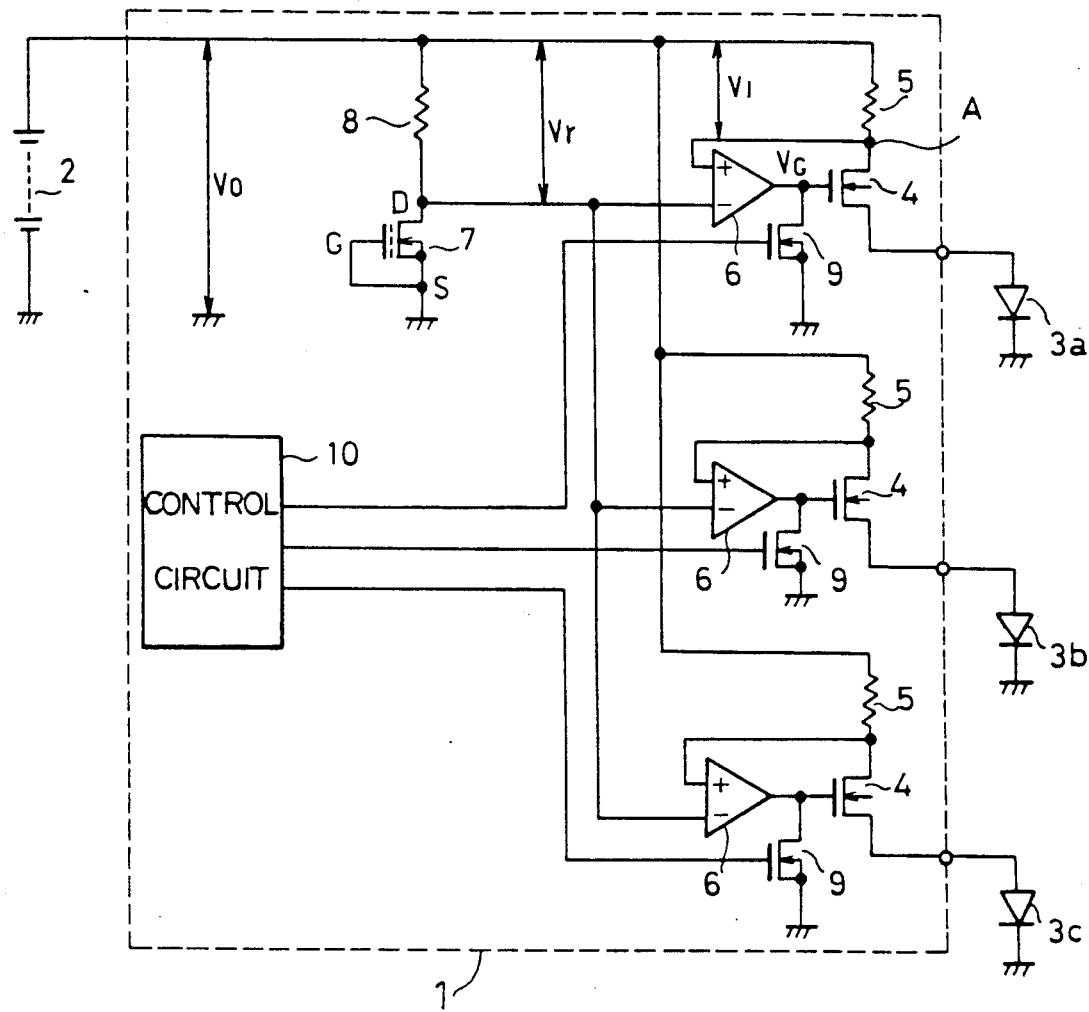
FIG. 1 is a circuit diagram of a conventional LED driving MOS integrated Circuit.

The MOS transistors 4a the voltage comparators 6a and the resistors 5a correspond to the MOS transistors 4, the voltage comparators 6 and the resistors 5 in the conventional LED driving MOS integrated circuit Shown in FIG. 1, respectively, and form a plurality of first constant current circuits to which a voltage $V_{r2}$ developed at a node B is applied as a first reference voltage Each first constant current circuit which comprises one current control element 4a, one voltage comparator 6a and one resistor 5a, is associated with one of the LED's to be driven. Ones of the LED's 3 to be energized to emit light are selected by means of associated switches 9.

The two MOS transistors 4b and 4c, the voltage comparator 6b and the resistor 5c form a second constant current circuit which uses a voltage $V_{r1}$ as a second reference voltage applied to a input terminal of the voltage comparator 6b. The second constant Current circuit forms mirror circuits with the respective first constant current circuits, whereby current $I_O$ flowing through the resistor 5c and current $I_2$ for driving each of the LED's 3 can be made equal. A voltage $V_{DD}$ is applied to this integrated circuit from an external DC voltage source (not shown)

Now, the operation is explained Since all of the first constant current circuits have the same configuration. The explanation of circuit operation is made in terms of only one of the first constant current circuit, but it should be noted that the same explanation is applicable to all the first constant current circuits.

In the second constant current circuit using, as its reference voltage, the voltage $V_{r1}$ applied to the +input terminal of the voltage comparator 6b, the high precision resistor 5c having substantially the same resistance value as the resistors 5a and 5b is connected in series with the MOS transistor 4c. The current $I_O$ flows through the resistor 5c. The current $I_O$ is, $$I_O = (V_{DD} - V_{r1})/R_E$$

voltage comparator 6b then develops an output voltage $V_{G1}$ which is applied to the MOS transistor 4c as its gate voltage. This voltage $V_{G1}$ is also applied, as a gate voltage, to the MOS transistor 4b which is formed to have the same characteristics as the transistor 4c, and, therefore, current $I_1$ flowing through the load resistor 5b has the same value as the current $I_O$ of the second constant current circuit. Accordingly, the reference voltage $V_{r2}$ at the node B that is applied to the +input terminal of the voltage comparator 6a is expressed as follows.

$$V_{r2} = V_{DD} - R_{IN}(V_{DD} - V_{r1})/R_E$$

Then, the current $I_2$ flowing through the resistor 5a, which is the current detecting element in the first constant current circuit using $V_{r2}$ as its reference voltage, is:

$$I_2 = (V_{DD} - V_{r2})/R_{IN} = (V_{DD} - V_{r1})/R_E = I_O$$

Thus, the drive current $I_2$ for the LED's 3 is determined by the high precision resistor 5c of the integrated circuit.

As stated previously, for a given design value, the resistance value of the resistors 5a and 5b may vary by more than ±35% from one integrated circuit to others, but within one particular integrated circuit, variations in resistance value of the resistors 5a and 5b are very small. Accordingly, in order to minimize variations in current value among different integrated circuits, it is sufficient to precisely adjust the values of the respective resistors 5c, in particular, by trimming. Instead of trimming the resistors 5c, the resistors 5c may be provided outside the integrated circuits, since inexpensive resistors having variations in value of less than ±1% are commercially available and can be used as the high-precision external resistors 5c. The use of one such external resistor for one integrated circuit Can greatly reduce variations in current value among a number of integrated circuits. Also, it is possible to obtain any desired value for the drive current.

Figure 3:
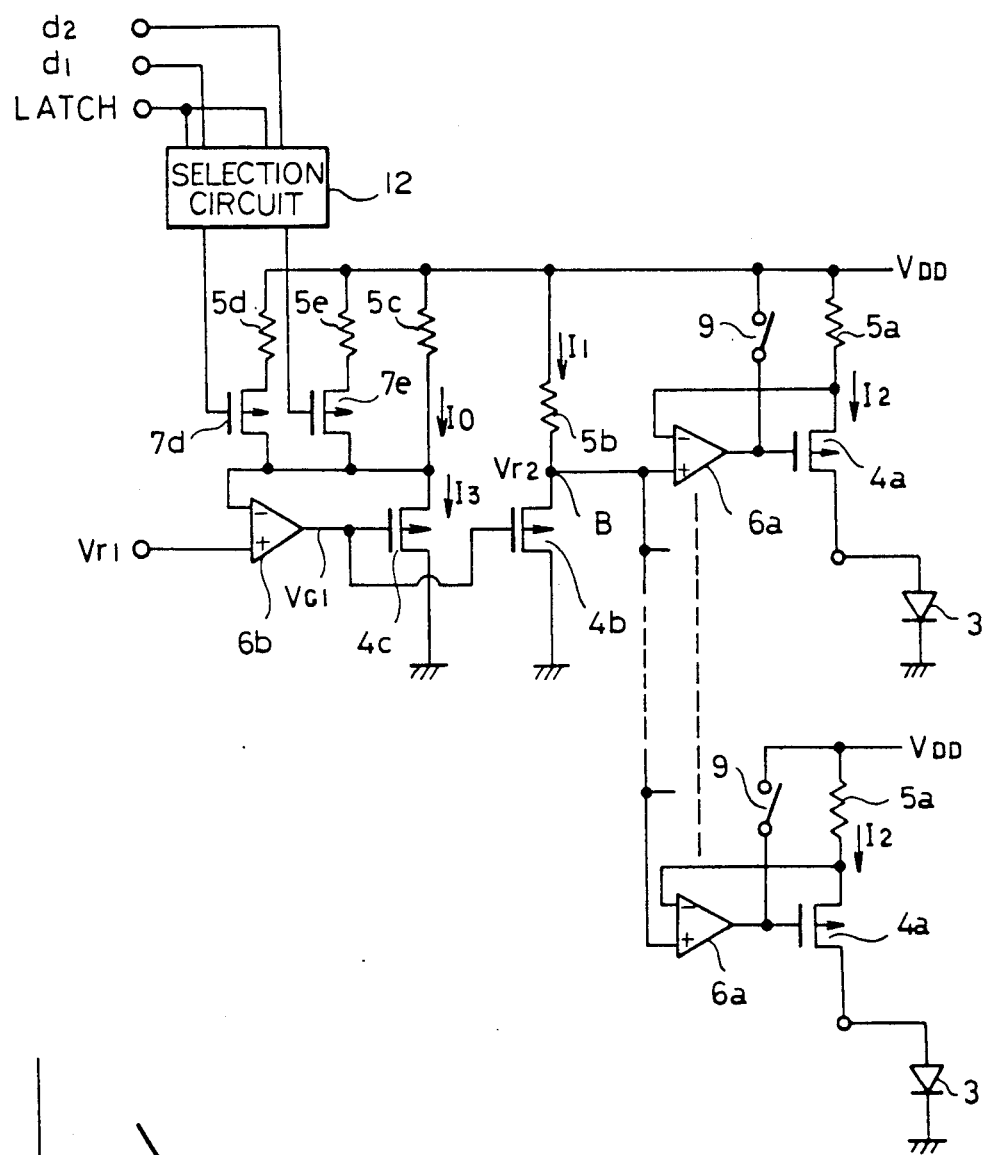
FIG. 3 is a circuit diagram of an LED driving MOS integrated circuit according to a second embodiment of the present invention.

FIG. 3 shows a second embodiment of the LED driving MOS integrated circuit according to the present invention. In FIG. 3, the same reference numerals and symbols as used in FIG. 2 are used for components and functions which appear also in FIG. 2, and explanations about them are not made.

Figure 4:
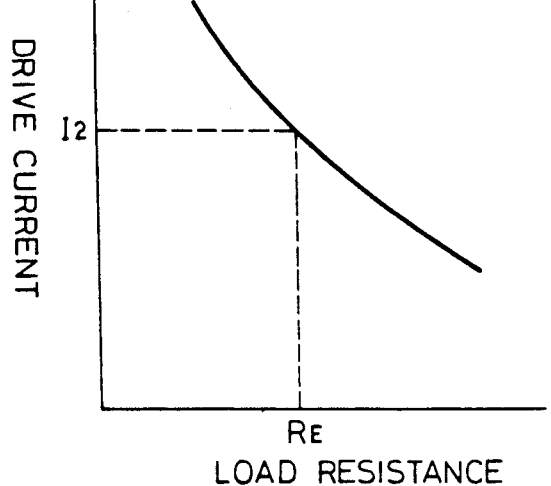
FIG. 4 shows relationship between drive current and load resistance in the LED driving MOS integrated circuits of the present invention.

In the second embodiment shown in FIG. 3, in addition to the resistor 5c, a plurality of resistance-adjustment resistors are used, for providing the load resistance for the transistor 4c. One or more of such resistance-adjustment resistors, as required, are connected in parallel with the resistor 5c. As shown in FIG. 4 the LED driving current 12 can be stably adjusted within a range of from 20% to 30% by adjusting the resistance value $R_E$ of the load resistance for the transistor 4c.

In FIG. 3, resistance-adjustment resistors 5d and 5e have four values that are, for example, about ten times that of resistor 5c. Switching elements (transistors in this embodiment) 7d and 7e. when enabled, connect the resistors 5d and 5e in parallel with the resistor 5c, respectively. A selection circuit (latch circuit in this embodiment) 8 receives a latch signal LATCH to store data d and d for on-off controlling the respective switching elements 7d and 7e.

Thus, the load resistance for the transistor 4c can assume four values, namely, the resistance value when both of the switching elements 7d and 7e are conductive, the resistance value when both of them are non-conductive, the resistance value when only one of them is conductive, and the resistance value when only the other switching element is conductive. Thus, by means of the control data $d_1$ and $d_2$. the load resistance value can be adjusted the basic resistors 5c of different integrated circuits can be compensated for and, hence, variations of drive currents among the integrated circuits can be minimized. Furthermore, it is possible to set the drive current at any desired value.

This second embodiment has been described to employ two resistance-adjustment resistors, but the number of the resistance-adjustment resistors can be increased to increase the adjustment steps accordingly so that the adjustment can be made more precisely.

In the first and second embodiments described in the above it is necessary to control the LED drive current in response to temperature, because the light output of the LED's is dependent on temperature and decreases as temperature increases This control can be provided by employing an arrangement in which the reference voltage $V_{r1}$ is applied to the integrated circuit from an external source. Using this arrangement, it is also possible to make the drive current values of a plurality of integrated circuits equal to each other and, it is also possible to set any desired value for the drive currents As stated above, according to the present invention, the values of the drive currents in the LED driving MOS integrated circuits can readily be made equal to each other by highly precise setting of the load resistances of the second constant current circuits of the respective integrated circuits Furthermore, by externally controlling the values of the drive currents, a uniform, stable light output can be provided from an LED array head driven by a plurality of integrated circuits of the present invention. In addition, if adjustable load resistors are used in the second constant current circuits, the same results as stated above can be obtained without incurring a large expense. Thus, according to the present invention, integrated circuits and, hence, LED array heads are fabricated at lower cost.

What is claimed is:

1. An integrated circuit for driving at least first and second power using devices, comprising:
   means for producing a first predetermined current;
   a current matter, responsive to said first predetermined current, for producing a second predetermined current;
   at least a first and a second driver devices;
   said first driver device including means for driving said first power-using device with a third current;
   said second driver device including means for driving said second power-using device with a fourth current;
   said third current having a first predetermined relationship to said second current;
   said fourth current having a second predetermined relationship to said second current;
   said means for producing a first predetermined current including a resistor; and
   means for permitting controlling a resistance of said resistor from a location external to said integrated circuit, whereby said first, second, third and fourth currents are controlled.

2. An integrated circuit according to claim 1 wherein said means for controlling includes means for permitting trimming of said resistor to a value effective to produce said first predetermined current.

3. An integrated circuit according to claim 1 wherein said means for controlling includes:
   at least a second resistor;
   switching means for selectively connecting said second resistor in parallel with said resistor; and
   said at least a second resistor having a value effective, when selectively connected in parallel with said resistor or produce a parallel combination passing said first predetermined current.

4. An integrated circuit according to claim 3, wherein:
   said switching means includes a switching transistor in series with said second resistor; and
   means for permitting selective switching control of said switching transistor from said location external to said integrated circuit.

5. An integrated circuit according to claim 1 wherein said integrated circuit includes MOS devices.

6. An integrated circuit according to claim 1 wherein:

said current mirror includes a second resistor;
said first driver device includes a third resistor;
said second driver device includes a fourth resistor;
said second, third and fourth resistors being formed integrally on said integrated circuit; and
said second, third and fourth resistors having predetermined relationships effective for producing said third and fourth currents.

7. An integrated circuit according to claim 1, wherein:
said second, third and fourth resistances having substantially equal values of resistance; and
said first, second, third and fourth currents are substantially equal to each other.

8. An integrated circuit for driving at least first and second light-emitting diodes comprising:
means for producing a first predetermined current;
a current mirror, responsive to said first predetermined current for producing a second predetermined current;
said second predetermined current being substantially equal to said first predetermined current;
a first driver device for driving said first light-emitting diode;
said first driver device including means, responsive to said second predetermined current, for applying a third predetermined current to said first light-emitting diode;
said third predetermined current being substantially equal to said second predetermined current;
a second driver device for driving said second light-emitting diode;
said second driver device including means, responsive to said second predetermined current, for applying a fourth predetermined current to said second light-emitting diode;
said fourth predetermined current being substantially equal to said second predetermined current;
said means for producing a first predetermined current including a resistor;
said resistor determining an amplitude of said first predetermined current; and
means for permitting control of a resistance of said resistor from a location external to said integrated circuit, whereby said first, second, third and fourth predetermined currents are controlled to a preferred value.

* * * * *